United States Patent
N et al.

(10) Patent No.: US 9,401,091 B2
(45) Date of Patent: Jul. 26, 2016

(54) SYSTEM AND METHOD FOR DISPLAYING IN-TRAIL PROCEDURE (ITP) ALLOCATIONS ON AN AIRCRAFT COCKPIT DISPLAY

(71) Applicant: HONEYWELL INTERNATIONAL INC., Morristown, NJ (US)

(72) Inventors: Mahesh Babu N, Bangalore (IN); Suresh Bazawada, Bangalore (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 336 days.

(21) Appl. No.: 14/026,811

(22) Filed: Sep. 13, 2013

(65) Prior Publication Data
US 2015/0077274 A1    Mar. 19, 2015

(51) Int. Cl.
| | | |
|---|---|---|
| G08G 3/02 | (2006.01) | |
| G08G 5/04 | (2006.01) | |
| G08G 7/02 | (2006.01) | |
| G08G 9/02 | (2006.01) | |
| G08G 5/00 | (2006.01) | |
| G01C 23/00 | (2006.01) | |

(52) U.S. Cl.
CPC *G08G 3/02* (2013.01); *G01C 23/00* (2013.01); *G08G 5/0008* (2013.01); *G08G 5/0021* (2013.01); *G08G 5/0039* (2013.01); *G08G 5/0052* (2013.01); *G08G 5/0078* (2013.01); *G08G 5/0013* (2013.01)

(58) Field of Classification Search
CPC .................................................. G08G 5/00
See application file for complete search history.

(56) References Cited

U.S. PATENT DOCUMENTS

| | | | |
|---|---|---|---|
| 7,570,178 B1 | 8/2009 | Whalen et al. | |
| 8,368,584 B2 | 2/2013 | Askelson et al. | |
| 2007/0200731 A1 | 8/2007 | Winkler et al. | |
| 2008/0284637 A1* | 11/2008 | Blessing | G01S 3/46 342/30 |
| 2009/0069959 A1 | 3/2009 | Horvath et al. | |
| 2009/0314896 A1* | 12/2009 | Rouquette | G05D 1/0607 244/180 |
| 2009/0322567 A1* | 12/2009 | Stock | G08G 5/045 340/963 |
| 2010/0030457 A1* | 2/2010 | Price | G08G 5/0013 701/120 |
| 2011/0224847 A1* | 9/2011 | Singer | G01C 23/00 701/4 |
| 2011/0270472 A1* | 11/2011 | Shafaat | G08G 5/0008 701/4 |
| 2012/0182161 A1* | 7/2012 | Rutherford | G08G 5/0008 340/945 |
| 2013/0006511 A1* | 1/2013 | Ramaiah | G08G 5/0004 701/120 |
| 2013/0009792 A1 | 1/2013 | Shafaat | |
| 2014/0368356 A1* | 12/2014 | Samuthirapandian | G08G 5/0004 340/901 |

FOREIGN PATENT DOCUMENTS

| | | |
|---|---|---|
| EP | 2199746 A2 | 12/2009 |
| EP | 2365287 A2 | 9/2011 |

OTHER PUBLICATIONS

Federal Aviation Administration. "Introduction to TCAS II." Version 7.1. Published Feb. 28, 2011.*
Richards, W. R. et al.: New Air Traffic Surveillance Technology, http://www.boeing.com/commercial/aeromagazine, Aero Quarterly, QTR_02.10.
EP Examination Report, EP 14182356.7-1803 dated Jul. 6, 2015.

* cited by examiner

*Primary Examiner* — Jennifer Mehmood
*Assistant Examiner* — Pameshanand Mahase
(74) *Attorney, Agent, or Firm* — Ingrassia Fisher & Lorenz, P.C.

(57) ABSTRACT

A system and method for increasing the vertical situational awareness of a pilot of a host aircraft, comprises rendering symbology on a vertical situation display of the host aircraft, the symbology comprising (1) a traffic scenario including at least the host aircraft and a second aircraft, the second aircraft involved in an ITP transition, and (2) flight level allocation data assigned to the second aircraft by air traffic control.

20 Claims, 8 Drawing Sheets

US 9,401,091 B2

SYSTEM AND METHOD FOR DISPLAYING IN-TRAIL PROCEDURE (ITP) ALLOCATIONS ON AN AIRCRAFT COCKPIT DISPLAY

TECHNICAL FIELD

Embodiments of the subject matter described herein relate generally to avionics systems such as cockpit flight display systems. More particularly, embodiments of the subject matter described herein relate to a system and method for displaying symbology on a cockpit display that relates to In-Trail Procedure (ITP) flight level allocations.

BACKGROUND

An in-trail procedure (ITP) is a protocol followed by an aircraft that desires to change its current flight level to a new flight level by descending or climbing in front of or behind one or more potentially blocking aircraft flying at an intervening flight level. In accordance with ITP criteria, certain conditions must be satisfied before the flight crew member issues a request for clearance to proceed with the flight level change. Whether or not the conditions are satisfied will depend on a number of dynamically changing factors associated with the host aircraft and other aircraft, such as the current geographic position of the aircraft, the current speed of the aircraft, the current heading of the aircraft, the desired new flight level, and the current flight level.

Modern flight deck instrumentation might include a traffic display that provides a two-dimensional representation of a host aircraft and neighboring aircraft. Such display systems typically provide a number of parameters and visual indicators that enable a pilot to form a quick mental picture of the vertical situation of the host aircraft. For example, such a system might include displays of an aircraft symbol, the aircraft altitude, the vertical flight plan, and terrain. In this manner, a member of the aircraft flight crew can obtain information related to the vertical situation of the aircraft relative to other aircraft with a simple glance at the display system.

In some cases, the pilot of a host aircraft (also referred to herein as the ownship) may desire to perform an ITP transition to a flight level that has already been allocated to another aircraft requesting an ITP transition. Unaware of this allocation, the ownship pilot will prepare and forward an ITP request to Air Traffic Control (ATC), where the request will be evaluated and rejected because the requested flight level has already been allocated. However, the ownship pilot will not be informed of which aircraft is performing an ITP transition or the assigned ITP transition altitudes. Thus, requesting ITP approval for a transition to an altitude that has already been allocated to another ITP transition wastes both pilot time and ATC time.

Considering the foregoing it would be desirable to provide a system and method for providing a graphical/textual indication on a host aircraft's ITP display that a flight level has been allocated pursuant to another aircraft's ITP request

BRIEF SUMMARY

In accordance with the forgoing, there is provided a method for increasing the vertical situational awareness of a pilot of a host aircraft, comprising rendering symbology on a vertical situation display of the host aircraft, the symbology comprising (1) a traffic scenario including at least the host aircraft and a second aircraft, the second aircraft involved in an ITP transition, and (2) flight level allocation data assigned to the second aircraft by air traffic control.

There is also provided a flight deck display system comprising a data communications module for receiving flight status data from neighboring aircraft, an ITP display element, an air/ground datalink, a user interface coupled to the ITP display element, a graphics system, and a processor. The processor is coupled to the data communications module, the ITP display element, the graphics system, the user interface, and the air/ground datalink, and is configured to render on the ITP display element (1) a vertical traffic scenario including the host aircraft and at least a second aircraft, and (2) a graphical representation of ITP flight level allocation data proximate the second aircraft.

Also provided is a method for displaying information related to an in-trail procedure (ITP) on an ITP display aboard a host aircraft. The method comprising obtaining current flight status data of the host aircraft and a second aircraft, rendering on the ITP display a vertical traffic scenario including at least the host aircraft and the second aircraft, and rendering on the ITP display, proximate the second aircraft, a graphical representation of ITP flight level allocation data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
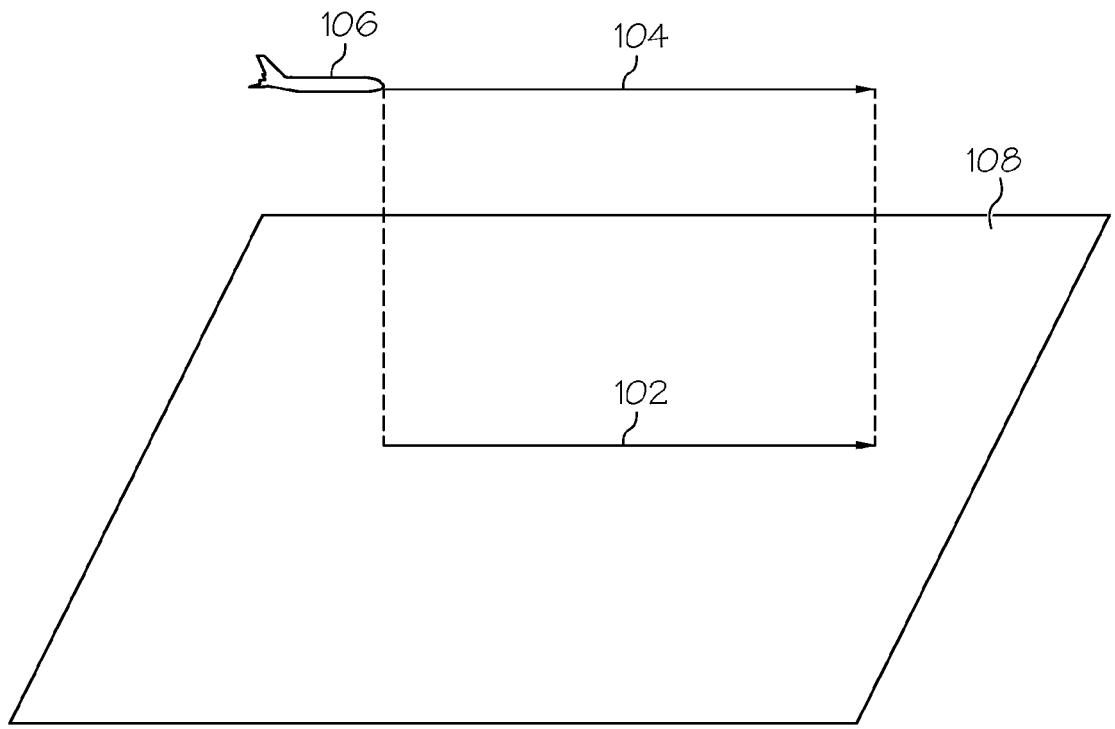
FIG. 1 is a diagram that illustrates the track associated with the flight path of an aircraft.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Although not always required, the techniques and technologies described here are suitable for use by aircraft using an ITP in an oceanic (or other) track system. For example, the techniques and technologies presented here could be used in connection with the ITP as defined and explained in the *Safety, Performance and Interoperability Requirements Document for the In-Trail Procedure in Oceanic Airspace (ATSA-ITP) Application*, RTCA/DO-312, Jun. 19, 2008. For ease of understanding and clarity, the following description employs terminology that is consistent with that used in the RTCA/DO-312 document. Moreover, the relevant portions of the RTCA/DO-312 document are incorporated by reference herein.

FIG. 1 is a diagram that illustrates track 102 associated with the flight path 104 of aircraft 106. Track 102 represents a projection of the flight path 104 onto a flat plane 108, which may correspond to the ground. Accordingly, track 102 will be the same whether the aircraft 106 maintains a fixed altitude, climbs, or descends while following flight path 104.

Figure 2:
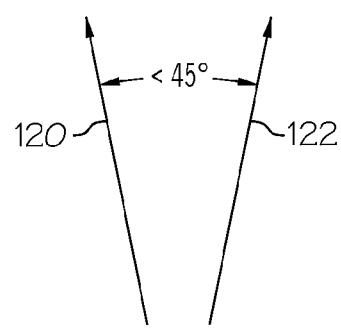
FIG. 2 is a diagram that illustrates the diverging tracks associated with two different aircraft.
Figure 3:
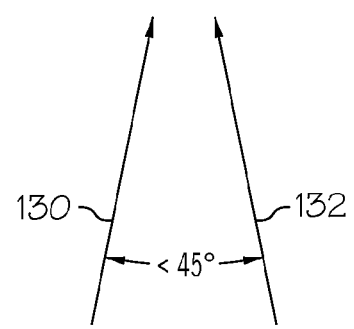
FIG. 3 is a diagram that illustrates the converging tracks associated with two different aircraft.

The RTCA/DO-312 document specifies that an in-trail procedure is a procedure that is employed by an aircraft that desires to change its flight level to a new flight level by climbing or descending in front or behind one or two, or between two same tracks, potentially blocking aircraft which are at an intervening flight level. A potentially blocking aircraft is an aircraft at an intervening flight level whose ADS-B data is available to the aircraft wishing to conduct an ITP maneuver. The host aircraft and any neighboring aircraft of interest (i.e., a potentially blocking aircraft) must be same track aircraft in order for an ITP flight level change to be requested. In this regard, "same track" means same direction tracks and intersecting tracks (or portions thereof) the angular difference of which is less than 45 degrees or more than 315 degrees. As an example, FIG. 2 is a diagram that illustrates the tracks 120 and 122 associated with two different aircraft. Even though the tracks 120/122 are divergent, they are considered to be in the same direction for purposes of the ITP because the angle between them is less than 45 degrees. As another example, FIG. 3 illustrates the tracks 130/132 associated with two different aircraft. Even though the tracks 130/132 are convergent, they are considered to be in the same direction for purposes of the ITP because the angle between them is less than 45 degrees.

Figure 4:
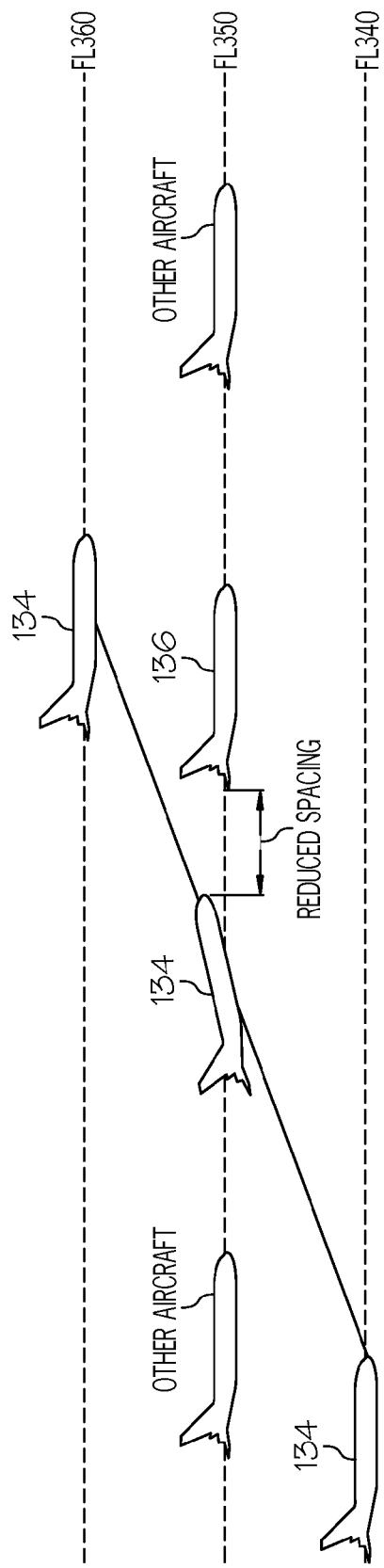
FIG. 4 is a diagram that illustrates a basic ITP maneuver.

As stated above, ITP is a protocol that can be followed when an aircraft seeks to change its flight level to a new flight level in the presence of potentially blocking aircraft located at an intervening flight level. For example, FIG. 4 is a vertical profile view illustrating a basic ITP procedure. In this case, aircraft 134 (i.e. the ITP aircraft) is seeking approval of an ITP procedure to climb from an initial flight level (FL340) through an intervening flight level (FL350) to a desired flight level (FL360). According to the RTCA/DO-312 document, ASTA-ITP was developed to enable either leading or following same track aircraft to perform a climb or descent to a requested flight level through an intervening flight level that might otherwise be disallowed when using standard separation minima. Moreover, the ITP specifies certain criteria that must be satisfied before the host aircraft can issue a request for ITP flight level change (such requests are issued to Air Traffic Control (ATC)).

RTCA/DO-312 defines reference aircraft as one or two similar track, potentially blocking aircraft no more than: 3,000 feet above or below the initial flight level, if vertical separation is 1,000 feet; or 2,000 feet above or below the initial flight level, if the vertical separation minima is 2,000 feet; with qualified ADS-B data that meets ITP speed/distance criteria and that will be identified to ATC by the ITP aircraft as part of the ITP clearance request. At least one of two ITP speed/distance criteria must be met: (1) if the ITP distance to a reference aircraft 136 is greater than or equal to 15 nautical miles, then the groundspeed differential between the two aircraft must be less than or equal to 20 knots; or (2) if the ITP distance to a reference aircraft 136 is greater than or equal to 20 nautical miles, then the groundspeed differential between the two aircraft must be less than or equal to 30 knots.

Figure 5:
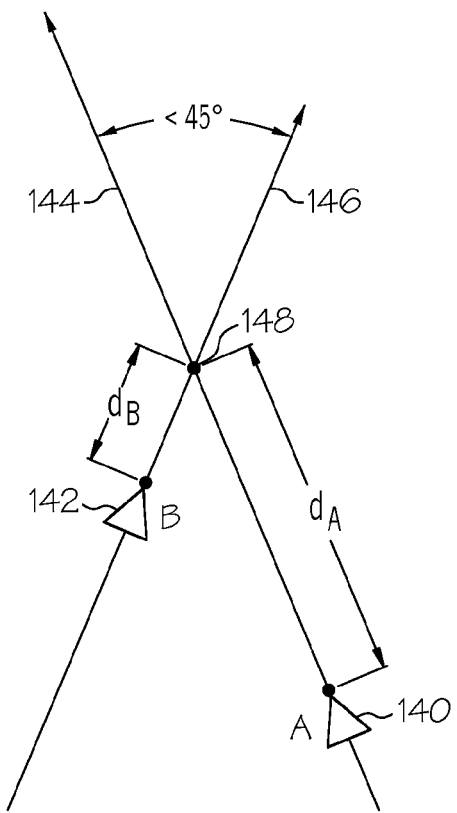
FIG. 5 is a diagram that illustrates the intersecting tracks associated with two different aircraft.

The ITP distance represents one appropriate measure of distance between the host aircraft and a nearby reference aircraft and potentially blocking, same track aircraft, which may be in front of or behind the host aircraft. Depending upon the particular embodiment, other distance metrics, distance measures, or relative spacing metrics could be used. For instance, the system could contemplate linear distance, time, aircraft acceleration, relative speed, closing rate, and/or other measureable or computable values that are dependent on the current geographic position, speed, acceleration, heading, attitude, or other operating status of the aircraft. The RTCA/DO-312 document defines the ITP distance as the distance between reference or potentially blocking aircraft and the ITP aircraft as defined by the difference in distance to a common point along each aircraft's track. In this regard, FIG. 5 is a diagram that illustrates the intersecting tracks associated with two different aircraft. In FIG. 5, one aircraft 140 is labeled "A" and another aircraft 142 is labeled "B". The aircraft 140 has a corresponding track 144, and the aircraft 142 has a corresponding track 146 that intersects the track 144 at a point 148. Note that the aircraft 140/142 are considered to be in the same direction because the angle between the two tracks 144/146 is less than 45 degrees. In FIG. 5, the label "$d_A$" identifies the current distance between the aircraft 140 and the point 148, and the label "$d_B$" identifies the current distance between the aircraft 142 and the point 148. For this example, the ITP distance ($d_{ITP}$) is defined by the following expression: $d_{ITP}=|d_A-d_B|$.

Figure 6:
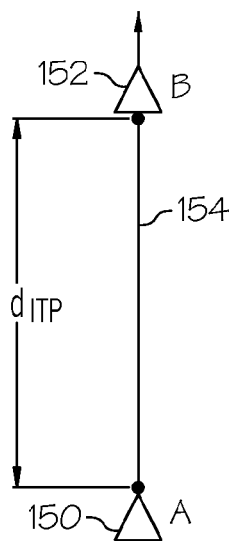
FIG. 6 is a diagram that illustrates the overlapping tracks associated with two different aircraft.

As another example, FIG. 6 is a diagram that illustrates the overlapping tracks associated with two different aircraft. In FIG. 6, one aircraft 150 is labeled "A" and another aircraft 152 is labeled "B". In this scenario, the two aircraft have a common or overlapping track 154. Consequently, the current distance between the two aircraft is also considered to be the ITP distance under these conditions. In FIG. 6, the label "$d_{ITP}$" indicates the current ITP distance between the aircraft 150 and the aircraft 152.

It is contemplated that the systems and methods described herein will cause to be displayed on a cockpit display (1) the flight level allocated by ATC to an aircraft that has requested an ITP transition, and (2) a graphical or textual indication of whether the ITP transition represents an increase or decrease in altitude.

Figure 7:
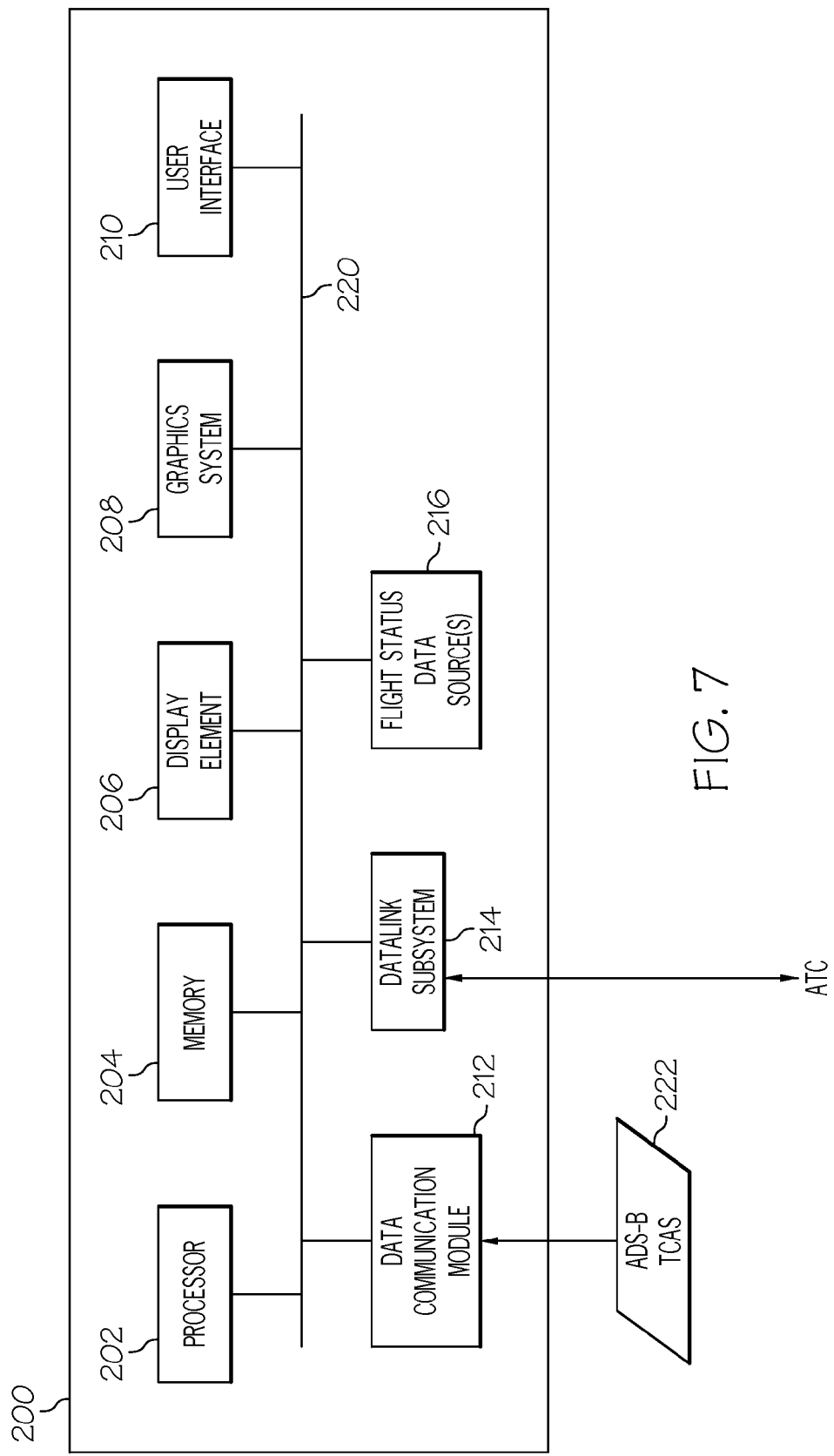
FIG. 7 is a block diagram of an exemplary embodiment of a flight deck display system.

The above described displays can be generated using a suitably configured onboard system, such as a flight deck display system. More preferably, the display can be generated by the traffic computer that may receive data from the Flight Management System (FMS). In this regard, FIG. 7 is a schematic representation of an exemplary embodiment of a flight deck display system 200 that is suitable for use with a vehicle such as an aircraft. In exemplary embodiments, the display system 200 is located onboard the host aircraft, i.e., the various components and elements of the display system 200 reside within the host aircraft, are carried by the host aircraft, or are attached to the host aircraft. The illustrated embodiment of the display system 200 includes, without limitation: at least one processor 202; an appropriate amount of memory 204; a display element 206; a graphics system 208; a user interface 210; a data communication module 212; a data link subsystem 214; and at least one source of flight status data 216. These elements of the display system 200 may be coupled together by a suitable interconnection architecture 220 that accommodates data communication, the transmission of control or command signals, and/or the delivery of operating power within the display system 200. It should be understood that FIG. 7 is a simplified representation of the display system 200 that will be used for purposes of explanation and ease of description, and that FIG. 7 is not intended to limit the application or scope of the subject matter in any way. In practice, the display system 200 and the host aircraft will include other devices and components for providing additional functions and features, as will be appreciated in the art. Furthermore, although FIG. 7 depicts the display system 200 as a single unit, the individual elements and components of the display system 200 could be implemented in a distributed manner using any number of physically distinct pieces of hardware or equipment.

The processor 202 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 202 obtains and processes current flight status data (of the host aircraft and one or more candidate reference aircraft and other neighboring aircraft) to determine ITP transition opportunities and to control the rendering of the ITP display in an appropriate manner.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. In practice, a functional or logical module/component of the display system 200 might be realized using program code that is maintained in the memory 204. For example, the graphics system 208, the data communication module 212, or the datalink subsystem 214 may have associated software program components that are stored in the memory 204. Moreover, the memory 204 can be used to store data utilized to support the operation of the display system 200, as will become apparent from the following description.

In an exemplary embodiment, the display element 206 is coupled to the graphics system 208. The graphics system 208 is coupled to the processor 202 such that the processor 202 and the graphics system 208 cooperate to display, render, or otherwise convey one or more graphical representations, synthetic displays, graphical icons, visual symbology, or images associated with operation of the host aircraft on the display element 206, as described in greater detail below. An embodiment of the display system 200 may utilize existing graphics processing techniques and technologies in conjunction with the graphics system 208. For example, the graphics system 208 may be suitably configured to support well known graphics technologies such as, without limitation, VGA, SVGA, UVGA, or the like.

In an exemplary embodiment, the display element 206 is realized as an electronic display configured to graphically display flight information or other data associated with operation of the host aircraft under control of the graphics system 208. In practice, the processor 202 and/or the graphics system 208 produces image rendering display commands that are received by the display element 206 for purposes of rendering the display. The display element 206 is usually located within a cockpit of the host aircraft. It will be appreciated that although FIG. 7 shows a single display element 206, in practice, additional display devices may be present onboard the host aircraft.

The illustrated embodiment of the display system 200 includes a user interface 210, which is suitably configured to receive input from a user (e.g., a pilot) or other crew member and, in response to the user input, supply appropriate command signals to the processor 202. The user interface 210 may be any one, or any combination, of various known user interface devices or technologies, including, but not limited to: a touchscreen, a cursor control device such as a mouse, a trackball, or joystick; a keyboard; buttons; switches; or knobs. Moreover, the user interface 210 may cooperate with the display element 206 and the graphics system 208 to provide a graphical user interface. Thus, a user can manipulate the user interface 210 by moving a cursor symbol rendered on the display element 206, and the user may use a keyboard to, among other things, input textual data. For example, the user could manipulate the user interface 210 to enter a desired or requested new flight level into the display system 200.

In an exemplary embodiment, the data communication module 212 is suitably configured to support data communication between the host aircraft and one or more remote systems. More specifically, the data communication module 212 is used to receive current flight status data 222 of other aircraft that are near the host aircraft. In particular embodiments, the data communication module 212 is implemented as an aircraft-to-aircraft data communication module that receives flight status data from an aircraft other than the host aircraft. For example, the data communication module 212 may be configured for compatibility with Automatic Dependent Surveillance-Broadcast (ADS-B) technology, with Traffic and Collision Avoidance System (TCAS) technology, and/or with similar technologies.

The flight status data 222 may include, without limitation: airspeed data; fuel consumption; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 200 is suitably designed to process the flight status data 222 in the manner described in more detail herein. In particular, the display system 200 can use the flight status data 222 when rendering the ITP display.

The data link subsystem 214 enables the host aircraft to communicate with Air Traffic Control (ATC). In this regard, the data link subsystem 214 may be used to provide ATC data to the host aircraft and/or to send information from the host aircraft to ATC, preferably in compliance with known standards and specifications. Using the data link subsystem 214, the host aircraft can send ITP requests to ground based ATC stations and equipment. In turn, the host aircraft can receive ITP clearance or authorization from ATC (when appropriate) such that the pilot can initiate the requested flight level change.

In operation, the display system 200 is also configured to process the current flight status data for the host aircraft. In this regard, the sources of flight status data 216 generate, measure, and/or provide different types of data related to the operational status of the host aircraft, the environment in which the host aircraft is operating, flight parameters, and the like. In practice, the sources of flight status data 216 may be realized using line replaceable units (LRUs), transducers, accelerometers, instruments, sensors, and other well-known devices. The data provided by the sources of flight status data 216 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; fuel consumption, etc. The display system 200 is suitably designed to process data obtained from the sources of flight status data 216 in the manner described in more detail herein. In particular, the display system 200 can use the flight status data of the host aircraft when rendering the ITP display.

Figure 8:
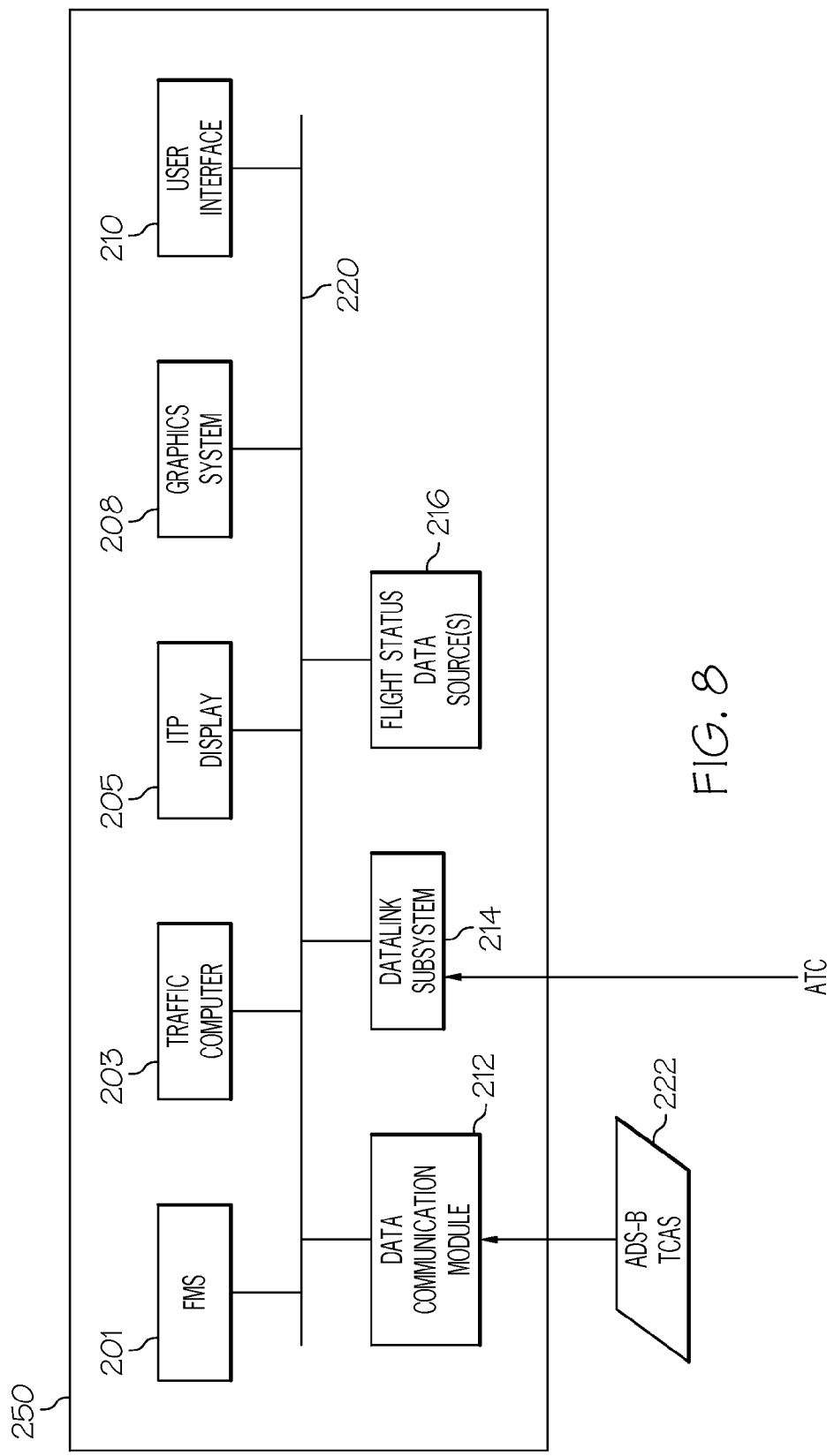
FIG. 8 is a block diagram of a further exemplary embodiment of a flight deck display system.

FIG. 8 is a schematic representation of a further exemplary embodiment of a flight deck display system 250 wherein like reference numerals represent like elements. The illustrated embodiment again includes, without limitation, graphics system 208, user interface 210, data communications module 212, data link subsystem 214, and at least one source of flight status data source 216 as was the case in the embodiment shown in FIG. 7. However, this exemplary embodiment includes Flight Management System (FMS) 201, a traffic computer 203, and an ITP Display 205 each coupled to interconnection architecture 220.

Flight Management System 201 is a specialized computer that automates a variety of in-flight tasks such as in-flight management of the flight plan. Using various sensors, the FMS determines the aircrafts position and guides the aircraft along its flight plan using its navigation database. Traffic Computer 203 processes surveillance data using ADS-B reports from the ADS-B receive function, and performs application specific processing. Surveillance reports, tasks, and any application specific information, e.g., alerts or guidance cues, are output to the traffic display function.

As stated previously, FMS 201 may be integrated with the traffic computer 203 (FIG. 8) and may predict the optimum altitude taking weather conditions and host aircraft dynamics into account. The predicted flight level changes are provided to ITP display 205, which determines flight level availability considering traffic in that flight level and determines when standard separation at the desired flight level will exist with respect to the host aircraft. The ITP display also determines availability of intermediate flight levels for transition. Based on the availability of the desired flight level and intermediate flight levels, the ITP opportunity time sets may be determined.

The pilot of a host aircraft (i.e. ownship) may desire to perform an ITP transition to a flight level that has already been allocated to another aircraft that has requested ITP transition. The ownship pilot, being unaware of this allocation, may prepare and forward an ITP request to ATC, which will be rejected because of the previous allocation without informing the host pilot of the identity of the aircraft performing the ITP transition or the ITP transition altitude. Thus, both pilot time and ATC time is wasted. To solve this problem, exemplary embodiments described herein relate to systems and methods for providing a graphical and/or textual representation on a host aircraft's display (e.g. the ITP display) that a flight level has been allocated pursuant to another aircraft's ITP request.

In one embodiment, aircraft in the vicinity of the host aircraft is provided with ADS-B (Automatic Dependent Surveillance-Broadcast) equipment that enables a pilot to view traffic data such as identification, current position, altitude, and velocity etc. via direct communication from nearby traffic. Thus, it is contemplated that the approved flight level associated with an ITP transition of a neighboring aircraft be transmitted via ADS-B along with the flight identification data to the host aircraft be displayed on the host aircraft's ITP display window. This will help prevent the pilot of the host aircraft from selecting an aircraft on the ITP display window as a reference aircraft for which ATC has already approved an ITP transition. In addition, it is also contemplated that the selection of previously approved flight levels be disabled to prevent the pilot of the host aircraft from inadvertently selecting a previously allocated flight level thus saving both ATC and pilot time and effort.

Figure 9:
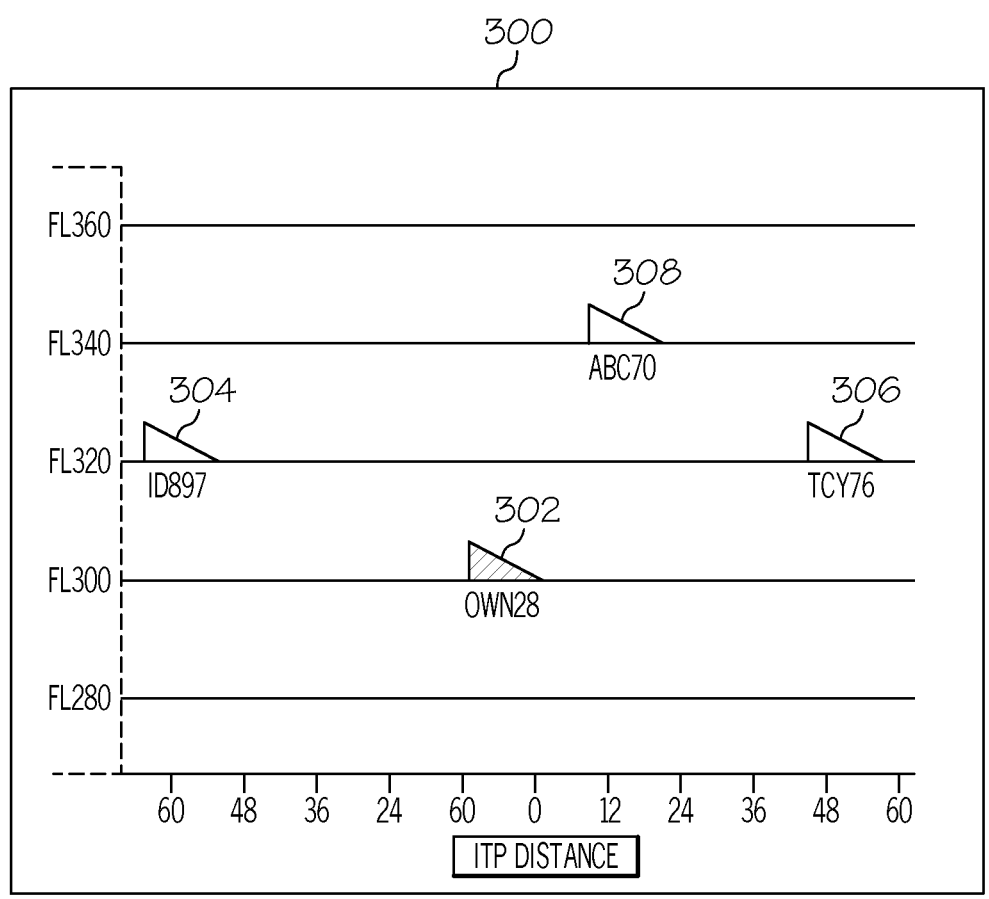
FIG. 9 illustrates an exemplary embodiment of an ITP display screen.

Referring now to FIG. 9, there is shown an exemplary ITP display 300. Host aircraft symbology 302 is depicted at FL300. In addition, a first neighboring aircraft 304 (ID897) is shown at FL320, a second neighboring aircraft 306 (TCY76) is shown at FL320, and a third neighboring aircraft 308 (ABC70) is shown at FL 340. Aircraft 308 has requested and has received approval for an ITP transition; however, FL320 has already been allocated to aircraft ABC70 for an ITP transition of its own. Since the host pilot is not aware of this previous allocation, the host pilot formulate and send an ITP request to ATC where it will be evaluated and subsequently rejected because FL320 has already been allocated to aircraft 308 (ABC70).

Figure 10:
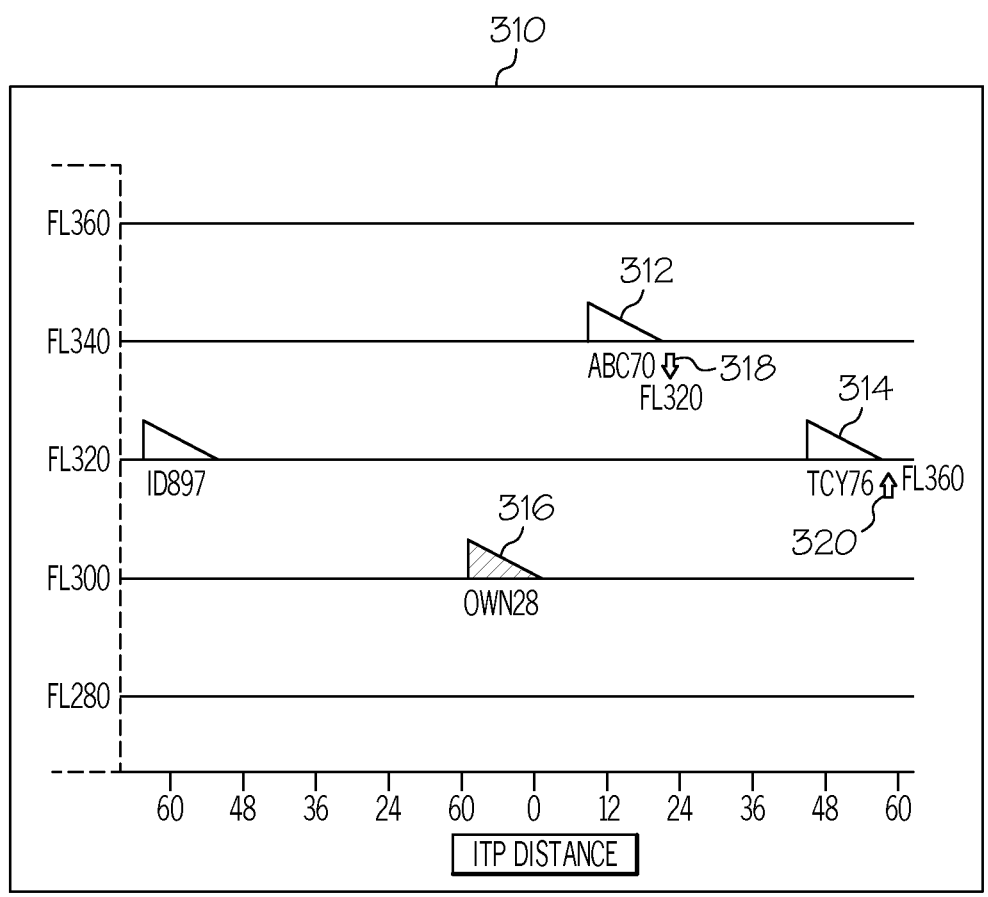
FIG. 10 illustrates an exemplary display screen in accordance with an embodiment.

Referring next to FIG. 10, there is shown an exemplary ITP display 310 in accordance with an exemplary embodiment. Here, symbology associated with aircraft that have been approved for an ITP transition to an allocated flight level are displayed on the host ITP display and include symbology that graphically/textually represents the destination flight level and the direction (i.e. increasing or decreasing altitude) of the transition. This may be accomplished by transmitting the flight ID and ITP transition flight level of potential reference aircraft (e.g. 312 in FIG. 10), via its ADS-B out transmitter, to host aircraft 316 (OWN28), which is then received by the ADS-B IN receiver of the host aircraft 316.

For example, referring still to FIG. 10, aircraft 312 (ABC70) has been approved for an ITP transition to FL320 and has been allocated FL320 by ATC. Similarly, aircraft 314 (TCY76) has received ITP approval for an ITP transition to FL360. Each of these aircraft transmits this information via their respective ADS-B out transmitters, which is received by the ADS-B IN receiver of the host aircraft 316 (i.e. data communication module 312 in FIG. 8). This information is then processed and displayed on ITP display 205 (FIG. 8) as shown in FIG. 10 along with, for example, an arrow indicating the direction of transition. Thus, displayed proximate aircraft symbology 312 is the aircraft symbology ABC70, the flight level allocation (FL320), and symbology 318 indicating a decrease in altitude to a lower flight level. Similarly, aircraft 314 (TCY76) has received ITP approval for an ITP transition to FL360. Each of these aircraft transmits this information via their respective ADS-B out transmitters, which is received by the ADS-B IN receiver of the host aircraft 316 (i.e. data communication module 312 in FIG. 8). This information is then processed and displayed on ITP display 205 (FIG. 8) as shown in FIG. 10 along with, for example, an arrow indicating the direction of transition (318 and 320). Thus, displayed proximate aircraft symbology 312 and 314 is the aircraft symbology ABC70 and TCY76 respectively, the flight level allocations (FL320 and FL 360), and symbols 318 and 320 indicating a decrease and increase, respectfully, in altitudes. In this manner, the pilot of host aircraft 316 will receive a visual indication on the ITP display that neither FL320 nor FL360 is available for an ITP transition of host aircraft 316, saving the time and effort on the part of the host pilot and ATC associated with processing an ITP request involving a previously allocated flight level. The system may disable FL320 and FL360 from being selected and prevent the pilot from selecting a previously allocated flight level.

Figure 11:
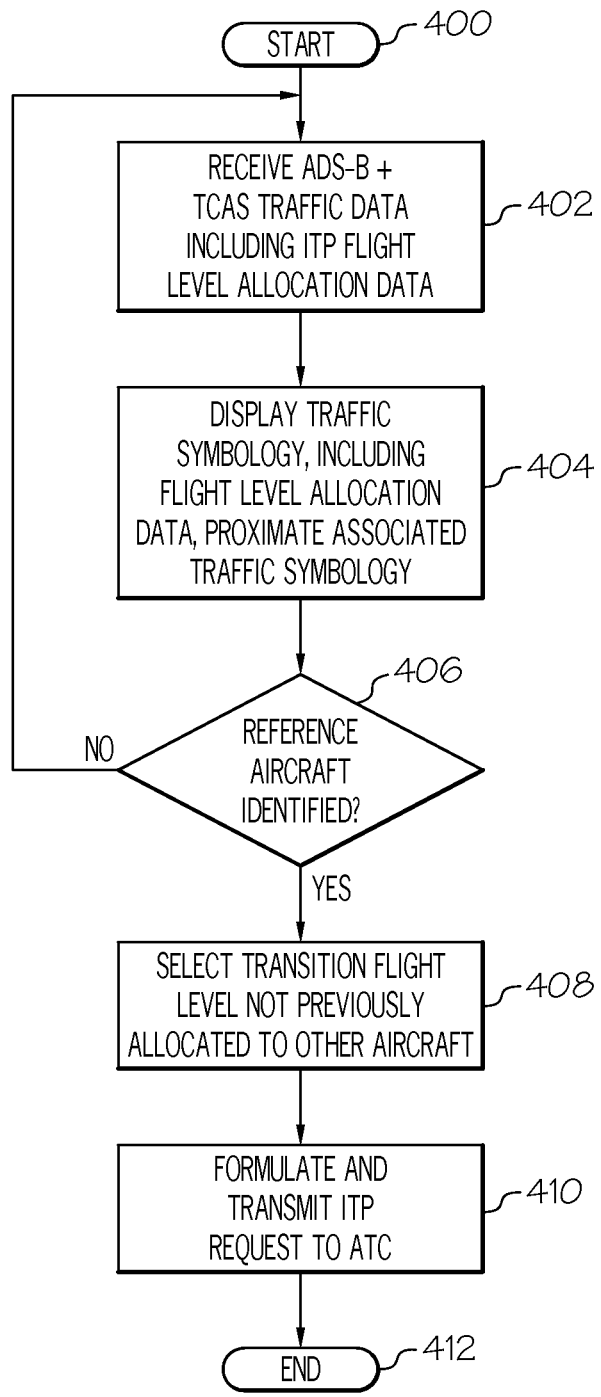
FIG. 11 is a flow chart illustrating an exemplary embodiment of an ITP display process suitable for use in conjunction with a flight deck display system

FIG. 11 is a flow chart that illustrates an exemplary embodiment of an ITP display process 400 suitable for use with a flight deck display system shown in FIGS. 7 and 8. Process 400 represents one implementation of a method for displaying the IDs and flight level allocations of traffic on an ITP display that have requested ITP transitions. The various tasks performed in connection with process 400 may be performed by software, hardware, firmware, or any combination thereof. For illustrative purposes, the following description of process 400 may refer to elements mentioned above in connection with FIGS. 7 and 8. In practice, portions of process 400 may be performed by different elements of the described system, e.g., a processor, a display element, or a data communication component. It should be appreciated that process 400 may include any number of additional or alternative tasks, the tasks shown in FIG. 11 need not be performed in the illustrated order, and process 400 may be incorporated into a more comprehensive procedure or process having additional functionality not described in detail herein. Moreover, one or more of the tasks shown in FIG. 11 could be omitted from an embodiment of the process 400 as long as the intended overall functionality remains intact.

As stated previously, FIG. 11 is a flow chart of a method 400 for displaying graphically and/or textually symbology representative of a vertical traffic scenario associated with an ITP. Initially, ADS-B and TCAS data (222 in FIGS. 7 and 8) including ITP flight level allocation data is received from nearby aircraft and provided to surveillance data communication module 212 (STEP 402). Next, traffic symbology (312 and 314 in FIG. 10) including allocated flight level 319 and 321, respectively, and direction arrows, 318 and 320, respectively, are displayed. That is, the allocated flight level and direction are displayed proximate their respective traffic symbology. In STEP 406, it is determined whether or not any reference aircraft have been identified. If no reference aircraft have been identified, the process begins again. If, however, reference aircraft have been identified, the pilot may select a transition flight level that has not been already allocated as indicated by the displayed flight level data (STEP 408). If an available flight level is suitable, the pilot may formulate and transmit an ITP request to ATC.

Thus, there has been provided a system and method for increasing the vertical situational awareness of a pilot of a host aircraft, comprising rendering symbology on a vertical situation display of the host aircraft, the symbology comprising (1) a traffic scenario including at least the host aircraft and a second aircraft, the second aircraft involved in an ITP transition, and (2) flight level allocation data assigned to the second aircraft by air traffic control.

While at least one exemplary embodiment has been presented in the foregoing detailed description, it should be appreciated that a vast number of variations exist. For example, the techniques and methodologies presented here could also be deployed as part of a fully automated guidance system to allow the flight crew to monitor and visualize the execution of automated maneuvers. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for increasing the vertical situational awareness of a pilot of a host aircraft, comprising:
   receiving, by a data communication module, current flight status data of aircraft near the host aircraft;
   processing current flight status data of aircraft near the host aircraft to determine approved flight level allocation data, the approved flight level allocation data corresponding to an ITP transition of a second aircraft and assigned to the second aircraft by air traffic control;
   rendering symbology on a vertical situation display onboard the host aircraft, the symbology comprising (1) a traffic scenario including at least the host aircraft and the second aircraft, and (2) the approved flight level allocation data.

2. The method of claim 1 wherein the vertical situation display is an ITP display.

3. The method of claim 2 wherein the flight level allocation data assigned to the second aircraft comprises a textual representation of the allocated flight level, placed proximate the second aircraft symbology.

4. The method of claim 3 wherein the flight level allocation data assigned to the second aircraft further comprises a graphical representation, placed proximate the second aircraft symbology, of the direction of the ITP transition of the second aircraft.

5. The method of claim 4 wherein the direction of the ITP transition is indicated by a graphical representation of an arrow.

6. The method of claim 5 wherein a transition to a higher level is graphically represented by an upwardly directed arrow.

7. The method of claim 6 wherein a transition to a lower level is graphically represented by a downwardly directed arrow.

8. The method of claim 4 further comprising displaying aircraft identification data proximate the second aircraft symbology and the flight level allocation data.

9. A flight deck display system for a host aircraft, the display system for generating symbology associated with an in-trail procedure (ITP) request including communications received from air traffic control (ATC), the display system comprising:
   a data communications module for receiving flight status data from neighboring aircraft;
   an ITP display element;
   an air/ground datalink;
   a user interface coupled to the ITP display element;
   a graphics system; and
   a processor coupled to the data communications module, the ITP display element, the graphics system, the user interface, and the air/ground datalink, the processor configured to
   (a) process current flight status data from neighboring aircraft to determine approved flight level allocation data, the approved flight level allocation data corresponding to an ITP transition of a second aircraft and assigned to the second aircraft by air traffic control; and
   (b) render on the ITP display element symbology representative of (1) a vertical traffic scenario including the host aircraft and at least the second aircraft, and (2) a graphical representation of the approved flight level allocation data of the second aircraft, placed proximate the second aircraft symbology.

10. The system of claim 9 wherein the flight level allocation data comprises a graphical representation, placed proximate the second aircraft symbology, of the direction of the ITP transition of the second aircraft.

11. The system of claim 10 wherein the direction of the ITP transition comprises a graphical representation of an arrow.

12. The method of claim 10 further comprising displaying aircraft identification data proximate the second aircraft symbology and the flight level allocation data.

13. A method for displaying information related to an in-trail procedure (ITP) on an ITP display aboard a host aircraft, the method comprising:
   obtaining current flight status data of the host aircraft and a second aircraft;
   determining that the second aircraft is in an ITP transition;
   rendering on the ITP display a vertical traffic scenario including symbology representative of at least the host aircraft and the second aircraft; and
   rendering on the ITP display, proximate the second aircraft symbology, a graphical representation of approved flight level allocation data, the approved flight level allocation data corresponding to the ITP transition of the second aircraft and assigned to the second aircraft by air traffic control.

14. The method of claim 13 wherein the flight level allocation data comprises a textual representation of the approved flight level.

15. The method of claim 14 wherein the flight level allocation data further comprises a graphical representation, proximate the second aircraft symbology, of a direction of the ITP transition of the second aircraft.

16. The method of claim 15 wherein the direction of the ITP transition comprises a graphical representation of an arrow.

17. The method of claim 16 wherein a transition to a higher level is represented by an upwardly directed arrow.

18. The method of claim 17 wherein a transition to a lower level is represented by a downwardly directed arrow.

19. The method of claim 16 further comprising displaying aircraft identification data proximate the second aircraft symbology and the flight level allocation data.

20. The method of claim 16 further comprising:
   obtaining current flight status data of the host aircraft and at least a third aircraft;
   determining that the third aircraft is in an ITP transition;
   rendering on the ITP display symbology representative of the third aircraft; and
   rendering on the ITP display, proximate the and third aircraft symbology, a graphical representation of approved flight level allocation data, the approved flight level allocation data corresponding to the ITP transition of the third aircraft and assigned to the third aircraft by air traffic control.

* * * * *